United States Patent Office 3,451,832
Patented June 24, 1969

3,451,832
RETARDED GYPSUM PLASTER COMPOSITIONS
Richard Andreas Kuntze, Scarborough, Ontario, Canada, assignor Domtar Limited, Montreal, Quebec, Canada
No Drawing. Filed Oct. 22, 1965, Ser. No. 502,613
Int. Cl. C04b 11/14
U.S. Cl. 106—111                                    15 Claims

ABSTRACT OF THE DISCLOSURE

A gypsum plaster composition containing as a set retarder a condensation product of an aliphatic amino-soil with formaldehyde, or an aliphatic dicarboxylic acid in which the two carboxyl groups are separated by a chain of five carbons.

---

The present invention relates to calcined gypsum plaster compositions and more particularly to calcined gypsum plasters containing a new type of set retarder.

Calcined gypsum consists essentially of calcium sulphate hemi-hydrate which, when mixed with water in suitable proportions, sets rapidly to provide the hard solid mass well known as set plaster. The setting process is generally believed to consist of the hydration of the calcium sulphate hemi-hydrate, $CaSO_4 \cdot \tfrac{1}{2} H_2O$, to the dihydrate, $CaSO_4 \cdot 2H_2O$, the resulting dense coherent mass being formed by the interlocking of the dihydrate crystals. The time which elapses between the initial mixing of the calcined gypsum and water into a slurry and the point when the formation and interlocking of dihydrate crystals make the plaster slurry no longer workable, is called the "setting time." The setting time can be determined by known procedures, which have been largely standardized, and in the case of ordinary unretarded calcined gypsum plasters will be of the order of about thirty minutes. It is often desirable to extend the time during which the calcined gypsum slurry is workable and it has now become common practice to add retarders to the calcined gypsum slurry in order to delay or extend the setting time of the plaster.

The best known group of retarders used conventionally with gypsum plasters are high molecular weight hydrolyzed products of proteinaceous animal or vegetable matter. Such protein hydrolysates are undefined and apparently complex mixtures of products of degradation of protein, and their composition will vary with the source of raw material and the hydrolyzing procedure. The properties of these retarders of natural origin, and particularly their retarding efficiency, will also vary from sample to sample and it may indeed be impossible to reproduce these properties with any degree of accuracy. Moreover, these compositions of proteinaceous origin often have a characteristic odour, they lack storage stability and their retarding efficiency is affected by the temperature prevailing during setting.

It is an object of the present invention to provide calcined gypsum compositions containing a synthetic retarder which possesses a substantially constant and reproducible retarding efficiency.

It is another object of the present invention to provide calcined gypsum compositions containing a synthetic retarder, the retarding efficiency of which is substantially independent of the temperature within a practical temperature range.

Another object of the invention is to provide a new series of synthetic retarders for use in calcined gypsum compositions, said retarders having a relatively simple and known molecular composition, and being substantially odourless and storage-stable.

The retarders of the present invention include certain polycarboxylic compounds, obtained by the condensation of aliphatic amino-acids with formaldehyde, as well as certain aliphatic dicarboxylic acid compounds in the molecule of which the distance along the chain between the carboxylic acid groups corresponds to five carbon links.

The aminoacid-formaldehyde condensates are prepared from relatively simple aliphatic aminoacids and water-soluble salts thereof wherein the relative position of the amino and carboxylic groups, i.e., the number of carbon links separating said functional groups, may be between 1 and 5. It is preferred to use aliphatic amino-acids wherein the amino group is either in position alpha or in position omega relative to the carboxylic group, i.e., either on the carbon next adjoining the carboxylic group or on the carbon at the opposite end of the chain from the carboxylic group. Examples of amino-acids used for such condensation are amino-acetic acid (glycine), amino-propionic acid (alanine), 2-amino-butyric acid, 2-amino-pentanoic acid (norvaline), ω-amino caproic acid (norleucine) and substituted amino-acids such as aspartic acid, glutamic acid, amino-pimelic acid, cystine, asparagine, arginine and the like. The resulting condensates can be generally represented by the formula:

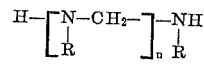

wherein R is an aliphatic carboxylic acid radical having a chain of a length corresponding to between 1 and 6 carbon atoms and in which the distance along the chain between the carboxylic group and the amino group is between 1 and 5 carbons and wherein $n$ is limited by the condition that the condensate is substantially water-soluble. The value of $n$ can be determined experimentally and is dependent on a number of factors such as proportion of the reactants, rate of the reaction, temperature of the reaction, etc. The condensation can be prepared by mixing the amino-acid with a molar excess of formaldehyde in the presence of an alkali and heating. An example of the preparation of such condensate is as follows:

1.66 of $Ca(OH)_2$ are mixed with 5.5 g. of glutamic acid heated to 90° C. on a water bath and the power mixture is then thoroughly wetted with 10.1 g. of a 40% solution of formaldehyde. The mixture is allowed to soak at 90° C. for 15 minutes, then transferred to a 120° C. oven or oil bath and dried.

The aliphatic dicarboxylic acids used as retarders in the present invention may be represented by the formula $HOOC-R_1-COOH$ wherein $R_1$ represents a chain consisting of five methylene groups in which one or more of said methylene groups may be replaced by a functional group such as NH, but preferably thio, and in which one or more of the hydrogen atoms on the methylene or amine groups may be replaced by functional groups such as carboxyl, amino, thio, or amide groups, or a lower carboxylic acid. The dicarboxylic acids, as defined, will include, in particular, pimelic acid, amino-pimelic acid, thiodiproprionic acid, lanthionine and the like. These acids may be used in the form of a water-soluble salt such as the sodium salt. As will be seen from the examples in Table II, other dicarboxylic acids, notably those in the molecule of which the distance along the chain between the carboxylic groups corresponds to two carbon atoms, also exhibit a certain retardancy power but are less effective.

The retarding action of the retarder compounds of this invention is not fully understood and, indeed, little is known, in general, about the mechanism of retardation of the setting of gypsum. It is not intended to link this invention to any particular theory explaining the phenomenon, but it is believed that the retardation effect is connected with the chemi-sorption of the retarder compounds on growing dihydrate nuclei or crystals, such a connection being suggested by a certain correlation between the dimensions across such nuclei or crystals and the optimum effective length of certain retarder molecules.

The synthetic retarders of this invention are incorporated with calcined gypsum plaster compositions in any known manner, substantially according to techniques used with the commercial retarders of the prior art. Thus, a stable premix may be prepared by adding the retarder as a powder to the calcined gypsum and mixing by mechanical means prior to adding the usual aggregates. Alternatively, the retarder may be added to the calcined gypsum or the gauging water just prior to use at the job site. Uniform mixing is easily obtained and no masterbatching is necessary, since the retarders of this invention are water-soluble and no non-uniform conditions arise on mixing water with the gypsum and the retarder. Any suitable proportion of retarder to mix may be used, depending on the intrinsic retarding efficiency of the particular retarder (which will vary from one retarder to another), on the retardation desired, the type of calcined gypsum, the composition of the mix, and the like. A concentration of between about ¼ to about 10 lbs. per ton of calcined gypsum has been found suitable in most cases.

The retarding efficiency of some of the retarder compounds of this invention, as measured by the setting time of the compositions containing the same, is shown in Table I. The retarders were added in amounts as indicated (in lbs./ton of calcined gypsum) and the setting time at normal temperature was determined by the temperature method, i.e. by heat of hydration measurements. It will be seen that, e.g., a glutamic acid-formaldehyde condensate is an excellent retarder, the potency of which exceeds considerably the potency of the conventional natural protein retarders commercially available, the latter being of the order of 3–4 hours when used in amounts of 3–5 lbs./ton. Similarly, some substituted dicarboxylic acids, as hereinabove described, such as thiodipropionic acid and lanthionine, show good retardancy.

TABLE I

| Retarder | Amount of retarder (in lbs./ton calcined gypsum) | Time of set (hrs.:min.) |
| --- | --- | --- |
| α-Alanine-formaldehyde condensate | 3 | 31:40 |
| β-Alanine-formaldehyde condensate | 2 | 3:50 |
| 2-amino butyric acid formaldehyde condensate | 2 | 1:50 |
| 3-amino butyric acid formaldehyde condensate | 2 | 6:40 |
| Glycine-formaldehyde condensate | 3 | 25:10 |
| Norleucine-formaldyhde condensate | 3 | 8:45 |
| Norvaline formaldehyde condensate | 3 | 10:30 |
| Aspartic acid-formaldehyde condensate | 3 | 21:40 |
| Amino-pimelic acid-formaldehyde condensate | 2 | 12:00 |
| Glutamic acid-formaldehyde condensate | 1½ | 17:30 |
| Cystine-formaldehyde condensate | 5 | 6:25 |
| Methionine-formaldehyde condensate | 2 | 1:05 |
| Asparagine-formaldehyde condensate | 3 | 33:10 |
| Arginine-formaldehyde condensate | 1½ | 1:10 |
| Lycine-formaldehyde condensate | 3 | 3:15 |
| Ornithine-formaldehyde condesnate | 3 | 1:55 |
| Amino-caproic acid-formaldehyde condensate | 2½ | 14:25 |
| Pimelic acid | 10 | 5:05 |
| Amino-pimelic acid | 10 | 4:50 |
| Thiodipropionic acid | 10 | 8:45 |
| Lanthionine | 10 | 30+ |

As hereinabove described, various aliphatic dicarboxylic acids show retarding properties, but a comparison of the properties of these acids makes it clear that substituted dicarboxylic acids having five methylene groups between the carboxylic functional groups and wherein the methylene groups are substituted or replaced by certain functional groups are particularly suited as retarders. Table II shows a comparison of the retarding properties of various dicarboxylic acids.

TABLE II

| Retarder | Amount | No. of C-atoms between COOH groups | Time of set (hrs.) |
| --- | --- | --- | --- |
| Oxalic acid | 10 | 0 | 0:20 |
| Malonic acid | 10 | 1 | 0:40 |
| Succinic acid | 10 | 2 | 1:05 |
| Glutaric acid | 10 | 3 | 0:30 |
| Adipic acid | 10 | 4 | 0:25 |
| Pimelic acid | 10 | 5 | 5:05 |
| Suberic acid | 10 | 6 | 1:15 |
| Azelaic acid | 10 | 7 | 1:55 |
| Sebacic acid | 10 | 8 | 0:20 |
| Aspartic acid | 10 | 2 | 3:20 |
| Glutamic acid | 10 | 3 | 1:35 |
| Aminoadipic acid | 10 | 4 | 0:40 |
| Aminopimelic acid | 10 | 5 | 4:50 |
| Thiomalic acid | 10 | 3 | 0:40 |
| Thiodipropionic acid | 10 | 5 | 8:45 |
| Lanthionine | 10 | 5 | >30:00 |

The synthetic retarders of this invention, being compounds of known or determinable chemical structure, have substantially reproducible retarding and other properties of the synthetic retarders do not change with time the usual natural protein retarders; moreover, the properties of the synthetic retarders do not change with time in storage, as is the case with natural retarders, and this storage-stability constitutes a very important advantage. Furthermore, the retarders of this invention have no obnoxious odour.

A particularly important aspect of this invention relates to the prepration of retarders, the potency of which is substantially not affected by temperature. As is well known, the retarding action of any given conventional retarder of protein origin is considerably higher when the ambient temperature increases. Thus, when using 3 lbs. of conventional retarder per ton of calcium gypsum, the set time will be 3:10 hrs.: mins. at 7° C., but 5:25 hrs.: mins. at 36° C. It has now been found that when individual retarder compounds of this invention are used for the retarding of the set of gypsum compositions, a rise in retardancy power (i.e., extension of setting time) with rising temperature is observed in some cases, but a fall in that power with rising temperature is observed in others. Thus, a glutamic acid-formaldehyde condensate has a positive retardancy-temperature correlation, whereas in the case of a cystine-formaldehyde condensate, the correlation is negative, i.e., with a rise in temperature, the retardancy power falls. Table III illustrates the differences in retardancy of some of the retarder compounds of this invention for different temperatures, other conditions remaining unchanged.

TABLE III

| Retarder | Time of set (hrs.:mins.) | | |
| --- | --- | --- | --- |
| | 7° C. | 21° C. | 36° C. |
| 2-aminobutyric acid-formaldehyde condensate | 3:10 | 6:10 | 12:35 |
| Glycine-formaldehyde condensate | 7:25 | 8:15 | 11:50 |
| Aminopimelic acid-formaldehyde condensate | 7:50 | 9:00 | 13:45 |
| Glutamic acid-formaldehyde condensate | 7:20 | 7:55 | 8:55 |
| Aspartic acid-formaldehyde condensate | 8:50 | 7:30 | 7:10 |
| Cystine-formaldehyde condensate | 6:00 | 5:50 | 3:50 |
| Pimelic acid (Na salt) | | 3:30 | 2:50 |
| Aminopimelic acid (Na salt) | | 6:25 | 5:05 |
| Thiodipropionic acid (Na salt) | | 5:30 | 4:35 |
| Lanthionine (Na salt) | | 6:30 | 5:10 |

It has been found that when a mixture of two or more retarders is prepared, of which one compound of the mixture has a positive retardancy-temperature curve and the other compound of the mixture has a negative one, the opposite tendencies, as it were, tend to cancel each other out, and a mixture is obtained, the retarding power of which is substantially independent of the ambient temperature in a practical temperature range, i.e., at temperatures which are likely to be normally encountered in work with gypsum compositions. Thus, a mixture in 50:50 molar ratio of glutamic acid-formaldehyde condensate and cystine-formaldehyde condensate shows substantially constant retardancy power for the whole practical range of temperatures. The same effect will be obtained when two or more such amino-acids are mixed and the mixture is used for condensation with formaldehyde. The dicarboxylic acid retarders of this invention, such as thiopropionic acid and lanthionine, all have negative retardancy-temperature curves, and when mixed with retarders having a positive retardancy-temperature curve, e.g., with a conventional retarder of the prior art, produce a retarder, the activity of which is substantially independent of the ambient temperature in a practical temperature range i.e., 10° C. to 40° C. Table IV shows some examples of gypsum compositions having substantially constant set times in the temperature range of practical importance, the compositions containing as retarders the mixtures of synthetic retarders, as indicated, in constant amounts.

TABLE IV

| Mixed retarders incorporated in gypsum composition | Ratio | Time of set (hrs.:mins.) | | |
|---|---|---|---|---|
| | | 7° C. | 21° C. | 36° C. |
| Formaldehyde condensate of aspartic acid, glutamic acid and glycine | 4:3:9 | 6:40 | 6:30 | 6:40 |
| Formaldehyde condensate of aspartic acid and glutamic acid | 1:1 | 6:55 | 7:50 | 7:20 |
| Formaldehyde condensate of glutamic acid and aspartic acid | 1:3 | 3:45 | 3:45 | 3:55 |
| Formaldehyde condensate of glutamic acid and cystine | 1:1 | 5:00 | 4:52 | 4:50 |
| Commercial retarder and thiodipropionic acid | 9:1 | | 4:10 | 4:20 |
| Commercial retarder and lanthionine | 3:1 | | 4:20 | 4:10 |

For comparison, it may be mentioned that a commercial retarder of the type shown above, when taken by itself, shows a change in retarding power with a change in temperature, as follows:

| National retarder (3 lbs./ton) | |
|---|---|
| | Time of set (hrs.:mins.) |
| Degrees C.: | |
| 7 | 3:10 |
| 21 | 3:40 |
| 36 | 5:25 |

The significance of such temperature-insensitive retarders will be appreciated by those men of the art who are familiar with the difficulties that often arise from the instability of retardancy power, and the changes in setting time, due only to changes in ambient setting temperature.

I claim:

1. An improved plaster composition comprising calcined gypsum plaster and, as a retarder for retarding the setting thereof, at least one compound selected from the group consisting of:
 (a) a water soluble condensation product of one of the group consisting of aliphatic amino-acids having a chain length, exclusive of the carboxyl, corresponding to between 1 and 6 carbon atoms and water-soluble salts thereof, with formaldehyde, said product being of the general formula

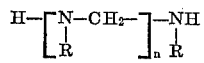

wherein R is the radical of said amino-acid, and $n$ is limited by the condition that the said condensation product is substantially water-soluble, and
 (b) a water-soluble compound of the group consisting of dicarboxylic acids and water-soluble salts thereof, said acids having the general formula $$HOOC-R_1-COOH$$

wherein $R_1$ is an aliphatic radical selected from the group consisting of: (I) a chain of five methylene groups; (II) a chain as in (I) wherein at least one of said methylene groups is replaced by a sulphur atom; (III) a chain as in (I) wherein at least one of said methylene groups has a substituent of the group consisting of an amino-, thio-, amido-, and lower carboxylic acid groups.

2. An improved plaster composition comprising calcined gypsum plaster and, as a retarder for retarding the setting thereof, at least one water-soluble condensation product of one of the group consisting of aliphatic amino-acids having a chain length, exclusive of the carboxyl, corresponding to between 1 and 6 carbon atoms and water-soluble salts thereof, with formaldehyde, said product being of the general formula

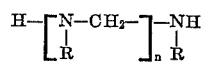

wherein R is the radical of said amino-acid, and $n$ is limited by the condition that the said condensation product is substantially water-soluble.

3. A plaster composition according to claim 2 wherein said amino-acid is selected from the group consisting of glutamic acid, glycine, alanine, norvalene, norleucine, aspartic acid, amino-pimelic acid, cystine, asparagine, 2-amino-butyric acid, 3-amino-butyric acid and a water-soluble salt thereof.

4. A plaster composition according to claim 2 wherein said amino-acid is glutamic acid.

5. A plaster composition according to claim 2 wherein said amino-acid is glycine.

6. A plaster composition according to claim 2 wherein said amino-acid is aspartic acid.

7. A plaster composition according to claim 2 wherein said retarder is a mixture of at least two water-soluble condensation products of said aliphatic amino-acids with formaldehyde, one of said amino-acids being selected from the group consisting of aspartic acid and cystine, said mixture having a retarding potency substantially constant with temperature.

8. An improved plaster composition comprising calcined gypsum plaster and, as a retarder for retarding the setting thereof, at least one water-soluble compound of the group consisting of dicarboxylic acids and water-soluble salts thereof, said acids having the general formula $$HOOC-R_1-COOH$$

wherein $R_1$ is an aliphatic radical selected from the group consisting of: (I) a chain of five methylene groups; (II) a chain as in (I) wherein at least one of said methylene groups is replaced by a sulphur atom; (III) a chain as in (I) wherein at least one of said methylene groups has a substituent of the group consisting of an amino-, thio, amido-, and lower carboxylic acid groups.

9. A plaster composition according to claim 8 wherein said dicarboxylic acid is selected from the group consisting of pimelic acid, amino-pimelic acid, thio-dipropionic acid and lanthionine.

10. A plaster composition according to claim 8 wherein said dicarboxylic acid is thiodipropionic acid.

11. A process for retarding the setting of calcined gypsum plaster compositions which comprises incorporating with said plaster compositions an effective amount of a retarder consisting essentially of at least one compound selected from the group consisting of:
 (a) a water-soluble condensation product of one of the group consisting of aliphatic amino-acids having a chain length, exclusive of the carboxyl, corresponding to between 1 and 6 carbon atoms and water-soluble salts thereof, with formaldehyde, said product being of the general formula

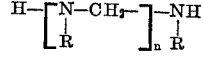

wherein R is the radical of said amino-acid, and $n$ is limited by the condition that the condensate is substantially water-soluble, and
 (b) a water-soluble compound of the group consisting of dicarboxylic acids and water-soluble salts thereof, said acids having the general formula $$HOOC-R_1-COOH$$

wherein $R_1$ is an aliphatic radical selected from the group consisting of: (I) a chain of five methylene groups; (II) a chain as in (I) wherein at least one of said methylene groups is replaced by a sulphur atom; (III) a chain as in (I) wherein at least one of said methylene groups has a substituent of the group consisting of an amino-, thio-, amido-, and lower carboxylic acid groups.

12. A process according to claim 11 wherein said amino-acid is glutamic acid.

13. A process according to claim 11 wherein said amino-acid is aspartic acid.

14. A process according to claim 11 wherein said amino-acid is glycine.

15. A process according to claim 11 wherein said dicarboxylic acid is thiodipropionic acid.

References Cited

UNITED STATES PATENTS

| 2,413,856 | 1/1947 | Bersworth. | |
| 2,448,218 | 8/1948 | Haddon | 106—111 |
| 2,499,445 | 3/1950 | Ammann | 106—315 |
| 3,219,675 | 11/1965 | Seekircher. | |

JAMES E. POER, *Primary Examiner.*

U.S. Cl. X.R.

106—315